United States Patent
Eiben et al.

(10) Patent No.: US 8,844,194 B1
(45) Date of Patent: Sep. 30, 2014

(54) VEGETATIVE ROOFING SYSTEMS

(71) Applicant: Furbish Company, LLC, Brooklyn, MD (US)

(72) Inventors: Ben Jacob Eiben, Baltimore, MD (US); Michael D. Furbish, Pasadena, MD (US); Brad Collier Garner, Washington, DC (US)

(73) Assignee: Furbish Company, LLC, Brooklyn, MD (US)

( * ) Notice: Subject to any disclaimer, the term of this patent is extended or adjusted under 35 U.S.C. 154(b) by 0 days.

(21) Appl. No.: 13/950,879

(22) Filed: Jul. 25, 2013

Related U.S. Application Data

(60) Provisional application No. 61/794,129, filed on Mar. 15, 2013.

(51) Int. Cl.
*A01G 9/02* (2006.01)
*A01G 1/00* (2006.01)
*A01G 9/00* (2006.01)

(52) U.S. Cl.
CPC . *A01G 9/00* (2013.01); *A01G 1/001* (2013.01)
USPC .......................................................... 47/65.9

(58) Field of Classification Search
USPC ................. 47/65.9, 1.01 F, 66.6, 66.7, 56
See application file for complete search history.

(56) References Cited

U.S. PATENT DOCUMENTS

| | | | | |
|---|---|---|---|---|
| 2,243,857 A * | 6/1941 | Fischer | ................................. | 47/9 |
| 2,632,979 A * | 3/1953 | Alexander | .................. | 47/1.01 F |
| 3,307,360 A * | 3/1967 | Bailly | .............................. | 405/38 |
| 3,894,355 A * | 7/1975 | Carothers | ....................... | 47/48.5 |
| 4,135,330 A * | 1/1979 | Aoyama | ...................... | 47/1.01 F |
| 4,949,503 A * | 8/1990 | Blok | .................................. | 47/64 |
| 5,006,013 A * | 4/1991 | Burkstaller et al. | ............ | 405/38 |
| 5,390,442 A | 2/1995 | Behrens | | |
| 5,502,921 A * | 4/1996 | Hyslop | .............................. | 47/32 |
| 5,634,294 A * | 6/1997 | Rohoza | ...................... | 47/58.1 R |
| 5,724,766 A | 3/1998 | Behrens | | |
| 8,127,515 B1 * | 3/2012 | Horvath | ...................... | 52/745.06 |
| 2006/0150500 A1 | 7/2006 | Behrens | | |
| 2010/0126066 A1* | 5/2010 | DeVos | ........................... | 47/65.9 |
| 2012/0005954 A1* | 1/2012 | Hartman | ....................... | 47/65.9 |

OTHER PUBLICATIONS

Nophadrain web page, retrieved from Internet for IDS filing on Feb. 19, 2013 from http://www.nophadrain.nl/EN/groene_daken_ producten.html Feb. 19, 2013.

(Continued)

*Primary Examiner* — Rob Swiatek
*Assistant Examiner* — Ebony Evans
(74) *Attorney, Agent, or Firm* — Bryan Cave LLP

(57) ABSTRACT

Vegetative systems are described. In one embodiment, a vegetative system has substantially distinct or separate zones or layers in which each zone or layer performs primarily one of the functions of water retention, a growth medium for vegetation, and weed suppression. An upper may comprise coarse aggregate and serve the primary function of weed suppression; a middle layer may comprise a mixture of coarse aggregate, fine aggregate, and fine organic material and serve primarily as a growth medium for vegetation; and a lower layer may comprise high-density hygroscopic material and serve the primary function of water retention.

30 Claims, 8 Drawing Sheets

(56) References Cited

OTHER PUBLICATIONS

Fytogreen web page, retrieved from Internet for IDS filing on Feb. 19, 2013 from http://www.fytogreen.com.au/green_roofs/index.htm Feb. 19, 2013.

Fytogreen web page, foam decays, retrieved from Internet for IDS filing on Feb. 19, 2013 from http://www.fytogreen.com.au/products/hydrocell/hydrocell.htm Feb. 19, 2013.

* cited by examiner

VEGETATIVE ROOFING SYSTEMS

RELATED APPLICATIONS

This application is a continuation-in-part of U.S. patent application Ser. No. 13/770,800 filed on Feb. 19, 2013. This application is also a non-provisional application of U.S. Provisional Patent App. No. 61/794,129 filed on Mar. 15, 2013.

FIELD OF THE DISCLOSURE

The present invention generally relates to vegetation systems for roofs and other artificial and natural surfaces and methods of assembling vegetation systems.

BACKGROUND

The term "green roof" is often used to describe a roof or similar surface that has been adapted to facilitate vegetative growth. Accordingly, a green roof system will employ a vegetative system that includes growth media and, typically, features to permit water that permeates the system to drain from the roof.

Traditional green roof systems rely on aggregate particle size distribution (PSD) as the primary means of retaining storm water. The standards for PSD originate with the FLL guidelines. FLL guidelines are green roof standards developed by the German Research Society for Landscape Development and Landscape Design (also known as Forschungsgesellschaft Landschaftsentwicklung Landschaftsbau e.V.). Generally the FLL guidelines call for an even-graded PSD to create approximately 35% void space, which is distributed between macropores and micropores. Micropores have a higher water retention capacity than macropores. Use of greater micropores requires a denser media (i.e., a greater proportion of small particle sizes), which adds weight to the system. Medias compliant with FLL guidelines weigh approximately 6-8 lbs/f$^2$ per inch of system depth when fully saturated. These medias retain up to 0.3 inches of rain per 1-inch of thickness, an efficiency which decreases as thickness increases. For example, a 4-inch green roof with FLL-compliant media will retain approximately 1 inch of storm water, whereas doubling the thickness to 8 inches will yield approximately 1.5 inches of storage. A 4-inch thick green roof compliant with FLL guidelines weighs approximately 28 lbs/f$^2$, of which only approximately 5 lbs, or 20% of the saturated weight, is water.

Furthermore, current vegetative systems used in green roofs may require significant maintenance to inhibit weed growth or promote growth of the desired vegetation and are inefficient storm water retention devices.

SUMMARY OF THE DISCLOSURE

Among the various aspects of the present disclosure is the provision of vegetative systems having substantially distinct or separate zones or layers in which each zone or layer performs primarily one of the functions of water retention, a growth medium for vegetation, and weed suppression. Other beneficial properties are found in vegetative systems of the present disclosure.

Briefly, the present disclosure is directed to a vegetative system, e.g., for use in constructing a green roof or other vegetation zone, that includes a freely draining, weed-suppressing upper layer; a middle nutritive layer; and a water retention lower layer. In a particular embodiment, the upper layer consists primarily of coarse aggregate; the middle layer consists primarily of a mixture of coarse aggregate, fine aggregate, and fine organic material; and the lower layer consists primarily of high-density hygroscopic material.

In one particular embodiment, the middle nutritive layer and the upper weed suppression layer are applied as a single layer that separates over time into substantially separate nutritive and weed suppression layers. In another embodiment, the nutritive and weed suppression layers are applied separately. In yet another embodiment, materials that, over time, will comprise the nutritive layer are initially applied on top of the weed suppression layer.

Plants, a filter layer, an air layer, a protection layer, a root barrier, or other gardening elements, such as stepping stones, edging, or gravel borders may be included certain embodiments of vegetative systems of the present disclosure. In other embodiments, a vegetative system includes support structures, such as supporting elements to hold vegetative elements onto a sloped roof.

Although the vegetative system is largely described in terms of substantially separate zones or "layers", the layers may interact with one another and transition zones may form at the intersection of layers. For example, some portion of the nutritive layer may settle into the water retention layer, the nutritive layer and the weed suppression layer may mix at the intersection of the layers, or the nutritive layer and the weed suppression layer may not fully separate into entirely distinct layers (e.g., in an embodiment in which the nutritive and weed suppression layers are applied as a composite layer, as discussed below). Additionally, as plants grow within the vegetative system, plant structures will be included within one or more layers or may extend root mass into all three layers. Furthermore, although the layers are generally described as a lower water retention layer, a middle nutritive layer, and an upper weed suppression layer, materials (e.g., layers) may be interposed between these layers. For example, a filter layer may be provided between one or more of the water retention, nutritive, and weed suppression layers.

Other objects and features will be in part apparent and in part pointed out hereinafter.

DETAILED DESCRIPTION

It must be noted that, as used in this specification and the appended claims, the singular forms "a," "an" and "the" include plural referents unless the content clearly dictates otherwise.

Unless defined otherwise, all technical and scientific terms used herein have the same meaning as commonly understood by one of ordinary skill in the art to which the disclosure pertains. Although a number of methods and materials similar or equivalent to those described herein can be used in the practice of the present disclosure, the preferred materials and methods are described herein.

All numbers expressing quantities of ingredients, constituents, and so forth used in the specification and claims are to be understood as being modified in all instances by the term "about." Notwithstanding that the numerical ranges and parameters setting forth the broad scope of the subject matter presented herein are approximations, the numerical values set forth in the specific examples are reported as precisely as possible. All numerical values, however, inherently contain certain errors necessarily resulting from the standard deviation found in their respective testing measurements.

Vegetative systems comprising storm water mitigation features and methods of assembling such systems are described. In the following description, for purposes of explanation, numerous specific details are set forth in order to provide a thorough understanding of various exemplary embodiments. It will be evident, however, to one of ordinary skill in the art that embodiments of the invention may be practiced without these specific details.

Vegetative Systems

Figure 1:
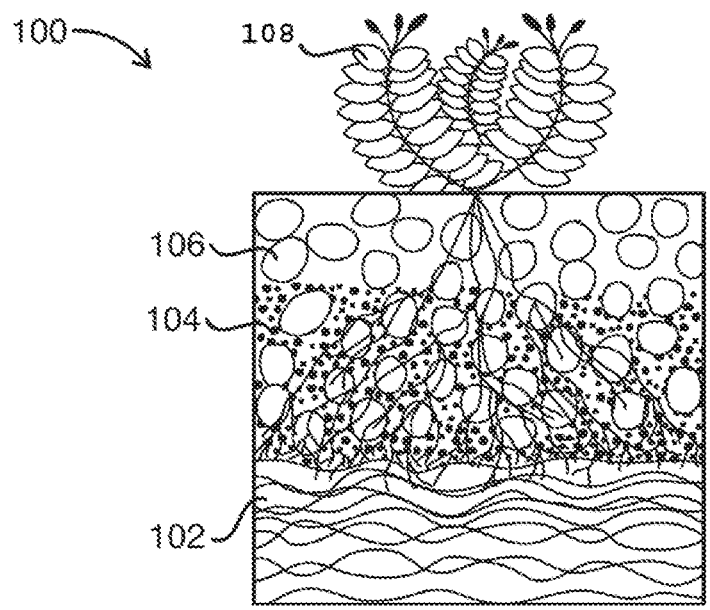
FIG. 1 is an illustration of an exemplary embodiment of a vegetative system of the disclosure.

FIG. 1 illustrates an exemplary embodiment of a vegetative system 100 of the invention. The vegetative system 100 includes a lower water retention layer 102, a middle nutritive layer 104, and an upper weed suppression layer 106.

Water Retention Layer

The water retention layer 102 of a vegetative system 100 may serve multiple functions related to water retention. It may prevent storm water runoff, store water for future use by plants, or allow water to evaporate fairly readily to prevent pooling or root rot.

The water retention layer 102 comprises one or more materials or structures that absorb or otherwise retain water. In certain embodiments, a material of the water retention layer holds water in suspension substantially throughout its volume and allows horizontal transmissivity.

In one embodiment, for example, the water retention capacity of the water retention layer (expressed as a percentage of volume) is at least 60% (e.g., 60%, 65%, 70%, 75%, 80%, 85%, 90%, 93%, 94%, 95%, 96%, 97%, 98%, 99° A, or 100%). In another embodiment, the water retention capacity is at least 80%. In yet another embodiment, the water retention capacity is at least 90%. Another alternative embodiment includes a water retention layer with a water retention capacity of at least 95%.

For purposes of this disclosure, references to measurements of "water retention capacity" of a vegetative system or component of a vegetative system (e.g., a water retention layer) refers to water retention capacity measured according to the following steps: (1) a one-foot square section of the system or system component to be measured is weighed and then placed into a container; (2) a quantity of water sufficient to fully submerge the section of the system or system component is added to the container; (3) after 24 hours, the section of the system or system component is removed from the container and placed on a screen or other surface that will permit water to drain from the section of the system or system component (or, alternatively, the water is allowed to drain from the container); (4) the section of the system or system component is left on the screen or other draining surface for one hour; and (5) measurements (e.g., saturated weight) of the drained section of the system or system component are taken. Comparisons between the measurements of the dry material and the drained material may used to identify measurements of water retention capacity. For example, the water retention capacity of a system or system component, expressed as a percentage of volume, may be determined by subtracting the dry weight from the saturated weight and using that difference to derive the water retention capacity, by volume, of a system or system component. The following illustrates one method of making this calculation (using experimental data for a water retention layer of an example embodiment of a vegetative system):

A 12-inch by 12-inch sample of a 1-inch thick system or system component has a dry volume of 144 cubic inches. 144 cubic inches equals 0.623 gallons.

In an example, a 12-inch by 12-inch by 1-inch sample of a water retention layer weighs 0.69 pounds when dry and 5.31 pounds when saturated according to the steps listed above. That sample is retaining 4.62 pounds of water (5.31−0.69=4.62).

1 gallon of water typically weighs 8.35 pounds. Using this weight, 4.62 pounds of retained water is approximately equivalent to 0.55 gallons of retained water (4.62/8.35=0.55).

In this example, 0.55 gallons of retained water equates to a water retention capacity of the water retention layer sample of 88% of its dry volume (0.55/0.623=0.88).

Other empirical measurements taken during a process similar to the process described above (e.g., of the volume of water added at step 2 and/or the volume of water drained at step 4) may be used to determine or approximate characteristics of the system or system component subjected to such process.

The water retention layer 102 may be further defined by its water retention under compression. In one embodiment, the water retention capacity under 100 pounds of compression is at least 80% of its uncompressed water retention capacity (e.g., 80%, 85%, 90%, 93%, 95%, 96%, 97%, or 98%). As discussed below, preferred materials for vegetative systems retain water under compression. In other embodiments, support structures, such as support beams, may be employed within a water retention layer to bear some or all of a compressive load that may be imposed upon the water retention layer (e.g., the weight of the upper layers and any additional weight, such as foot traffic), thereby increasing the water retention capacity under compression above the level provided by the absorptive materials of the water retention layer.

References to "water retention under compression" refer to calculations made in connection with a process like the process used to determine water retention capacity, described above, except that in step 3, compressive force is applied to the system or system component as it drains. For example, to determine water retention capacity under 100 pounds of compression, 100 pounds of force is applied to the system or system component during the draining step 3 (e.g., by placing a 100 pound weight on top of the system during such step).

Other characteristics of a water retention layer are its saturated weight and its dry weight. In certain embodiments, the saturated weight of the water retention layer of a vegetative system is equal to or less than 60 lb/ft$^2$ (e.g., 60 lb/ft$^2$, 56 lb/ft$^2$, 50 lb/ft$^2$, 45 lb/ft$^2$, 40 lb/ft$^2$, 35 lb/ft$^2$, 30 lb/ft$^2$, 25 lb/ft$^2$, or 20 lb/ft$^2$). In certain preferred embodiments, the saturated weight of the water retention layer of a vegetative system is equal to or less than 30 lb/ft$^2$. In an example embodiment, the saturated weight of the water retention layer is approximately 15 lb/ft$^2$.

A low dry weight to saturated weight ratio is preferred for some embodiments of water retention layers of vegetative systems of the disclosure. In certain embodiments, the dry weight of the water retention layer is 20% or less (e.g., 20%, 18%, 15%, 13%, 10%, or less than 10%) than its saturated weight. In some embodiments, the dry weight of the water retention layer is less than 15% of the saturated weight of the water retention layer.

In certain embodiments, the water retention layer includes rock wool (also known as mineral wool). In some preferred embodiments, the rock wool is high density post-industrial rock wool. In some embodiments, the water retention layer of a vegetative system comprises rock wool with a density in the range of 4 lb/ft³ to 16 lb/ft³ (e.g., 4 lb/ft³, 6 lb/ft³, 8 lb/ft³, 10 lb/ft³, 12 lb/ft³, 14 lb/ft³, or 16 lb/ft³). In certain preferred embodiments, the water retention layer of a vegetative system comprises rock wool with a density in the range of 8 lb/ft³ to 16 lb/ft³.

In one example vegetative system embodiment, the water retention layer comprises rock wool with a density of 8 lb/ft³ which holds approximately 90% of its volume in water; the weight of the retained water is approximately equal to ten times the dry weight of the rock wool. In this embodiment, if supersaturated, the water flows horizontally within the water retention layer, e.g., toward roof drains; when not supersaturated, the water remains within the layer until it is utilized by plants or evaporates. In this embodiment, the water retention layer dries rapidly. This rapid drying creates a high ambient recharge capacity, allowing the vegetative system layer to handle closely spaced storm events. The peak flow reduction characteristics of this embodiment are increased, relative to current vegetative systems, due to a lengthened hydraulic resistance time.

In an experiment, the transmissivity of a saturated one foot square water retention layer composed of a one inch thick section of rock wool with a density of 8 lb/ft³ with an applied lateral load of 100 lb/ft² was measured at 0.05 gallons per minute at a slope of a quarter inch rise to a foot run, applying the ASTM D-4716 standard test (the Standard Test Method for Determining the (In-plane) Flow Rate per Unit Width and Hydraulic Transmissivity of a Geosynthetic Using a Constant Head).

Preferred materials for a water retention layer are polymeric or inorganic. In addition to rock wool, other polymeric or inorganic materials that may be used in the water retention layer of a vegetative system, include, by way of example, post-industrial non-woven fibers, such as industrial felt (also known as capillary fabric), other non-woven geotextiles, microporous insulation board, open cell ceramic foams, high density melamine foam, glass wool board, high density open cell polyurethane foam board, and other materials that exhibit one or more characteristics of a water retention layer of the vegetative systems of the present disclosure. In an example embodiment of a vegetative system, the water retention layer comprises industrial felt with a water retention capacity in the range of 60 to 80%. In a preferred embodiment, at least ninety five percent (95%) of the materials comprising a water retention layer are polymeric or inorganic.

In some embodiments, the water retention layer includes a filter fabric or other separation feature either at or near the top of the water retention layer (e.g., to serve as a filtering barrier between the nutritive (or composite layer) and the water retention layer) or at or near the bottom of the water retention layer (e.g., to serve as a filtering barrier, or, alternatively a more complete barrier, between the water retention layer and other protective membranes, roofing structures, and the like), or both. In one embodiment, a filter fabric with the characteristics listed in Table 1, below, is provided at the top of the water retention layer (e.g., just below the nutritive (or composite layer)).

TABLE 1

| Characteristic | Minimum Average Value (and Measurement Standard) |
| --- | --- |
| Unit Weight | 4 oz/SY (ASTM D-3776) |
| Grab Tensile Strength | 100 lbs (ASTM D-4632) |

TABLE 1-continued

| Characteristic | Minimum Average Value (and Measurement Standard) |
| --- | --- |
| Grab Elongation | 50% (ASTM D-4632) |
| CBR Puncture Strength | 300 lbs (ASTM D-6241) |
| Mullen Burst Strength | 200 psi (ASTM D-3786) |
| Trapezoidal Tear | 30 lbs (ASTM D-4533) |
| Apparent Opening Size (AOS) | 0.212 mm (ASTM D-4751) |
| Permittivity | 1.7 sec -1 (ASTM D-4491) |
| Water Flow Rate | 100 gpm/ft2 (ASTM D-4491) |
| UV Resistance @ 500 hrs | 70% retained (ASTM D-4491) |

In embodiments that include a filter fabric or other separation feature, other types of fabrics (which may be comprised of cloth, plastic, nylon, or other materials) or other separation features may be used.

The thickness or height of a water retention layer may be defined as the distance between the bottom of the water retention layer and the top of the water retention layer. For example, in some embodiments, the bottom of the water retention layer is that portion of the water retention layer in contact with an underlying roofing structure or a membrane, fabric, drain sheet, or the like interposed between the water retention layer and the underlying roofing structure. The top of the water retention layer may refer generally to that portion of the water retention layer in contact with the nutritive layer (or composite layer or what will become the nutritive layer, upon settling), it being understood that "top" may not be (or may not remain) a clearly defined point and may refer to any point within a transition zone between the water retention layer and the nutritive layer (or composite layer), as discussed above. The height of a water retention layer may vary across a vegetative system of the present disclosure.

In certain preferred embodiments, the water retention layer is between 1 inch and 6 inches thick (e.g., 1 inch, 2 inches, 3 inches, 4 inches, 5 inches, or 6 inches). In another embodiment, the water retention layer is at least 7 inches thick, and it yet another embodiment, the water retention layer is at least 0.5 inches thick. In one preferred embodiment, the water retention layer is between 2.5 and 3 inches thick; in another preferred embodiment, the water retention layer is between 1 and 3 inches thick.

The thickness of the water retention layer may be selected based on one or more criteria such as: (1) capacity to satisfy a targeted storm water holding capacity, (2) weight limits of the system (e.g., based on the structural integrity of the underlying structure), (3) uplift requirements, (4) climate considerations, (5) moisture requirement of the plants of the vegetative system, and (6) total system thickness. For example, in an embodiment in which the water retention layer comprises 3 inches of rock wool, only that water retained in the upper portion (e.g., the top 2 inches, 1.5 inches, inch, or 0.5 inch) is available to plants, e.g., via interaction with the nutritive layer. Accordingly, in this example, the entire water retention layer serves to satisfy a targeted storm water holding capacity while only the top portion of the water retention layer serves as a material source of water for the plants of the vegetative system. In a water retention layer comprising 3 inches of rock wool with a density in the range of 8 to 16 lbs/ft³, the water retention layer may provide adequate storm water mitigation for up to a 3.5 inch rainfall. In other embodiments, a 3 inch water retention layer provides adequate storm water mitigation for up to a 1.8 inch rainfall.

In certain preferred embodiments, the thickness of the water retention layer of a vegetative system is at least 25% of the combined thickness of the water retention, nutritive, and weed suppression layers of that system.

In some embodiments, including certain embodiments that comprise rock wool, the vertical column of the water retention layer promotes distribution of water throughout the water retention layer and, correspondingly, discourages pooling of water at or near the top of the water retention layer. Embodiments of the vegetative system that discourage pooling of water at or near the top of the water retention layer provide an effective growth environment for plants of the vegetative system and mitigate the risk of root rot.

Nutritive Layer and Weed Suppression Layer

In addition to a lower water retention layer 102, vegetative systems of the present disclosure include a middle nutritive layer 104 and an upper weed suppression layer 106.

Figure 2:
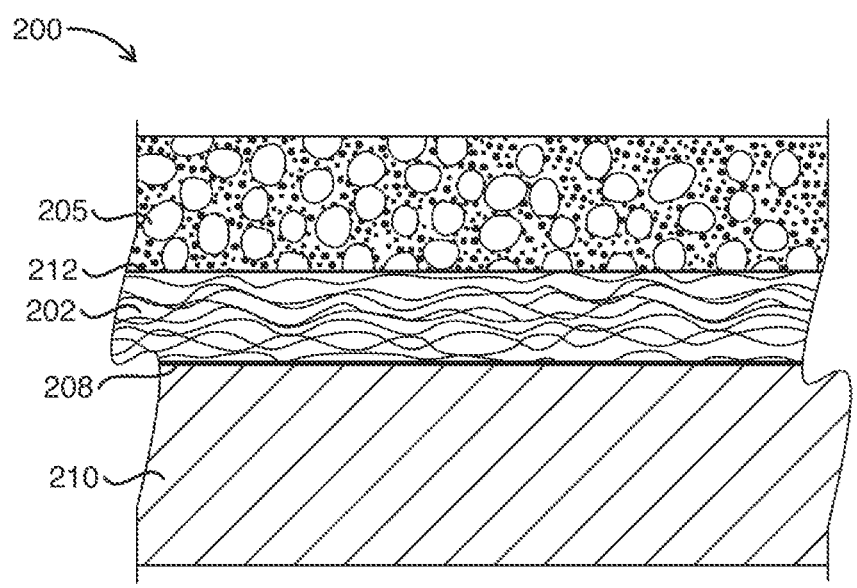
FIG. 2 is an illustration of another exemplary embodiment of a vegetative system of the disclosure.

In certain preferred embodiments of the vegetative systems, such as the embodiment illustrated in FIG. 2, the components of the nutritive layer and weed suppression layer are applied as a composite layer 205 to a water retention layer 202 as a blend which separates into two layers; the weed suppression layer and the nutritive layer.

A composite layer 205 may separate over time (e.g., in various embodiments, within the first growing season, within about 2 weeks, within about 1 month, within about two 2 months, or within about 3 months) into two relatively distinct weed suppression and nutritive layers. Separation may be allowed to occur naturally over time, in which settlement is promoted via rainfall or may be encouraged with supplied water application. However, there may not be clear distinction between the weed suppression layer and the nutritive layer as the composite layer (over time) may gradually transition from a coarser, drier aggregate above (e.g., the weed suppression layer) to a finer, moister aggregate below (e.g., the nutritive layer).

In certain embodiments in which nutritive and weed suppression layers are supplied initially as a composite layer, the composite layer includes a blend of coarse aggregate, fine aggregate, and a fine organic component that will separate into an upper weed suppression layer comprising primarily of coarse aggregate and a middle nutritive layer comprising a mixture of coarse aggregate, fine aggregate, and a fine organic component.

Figure 3:
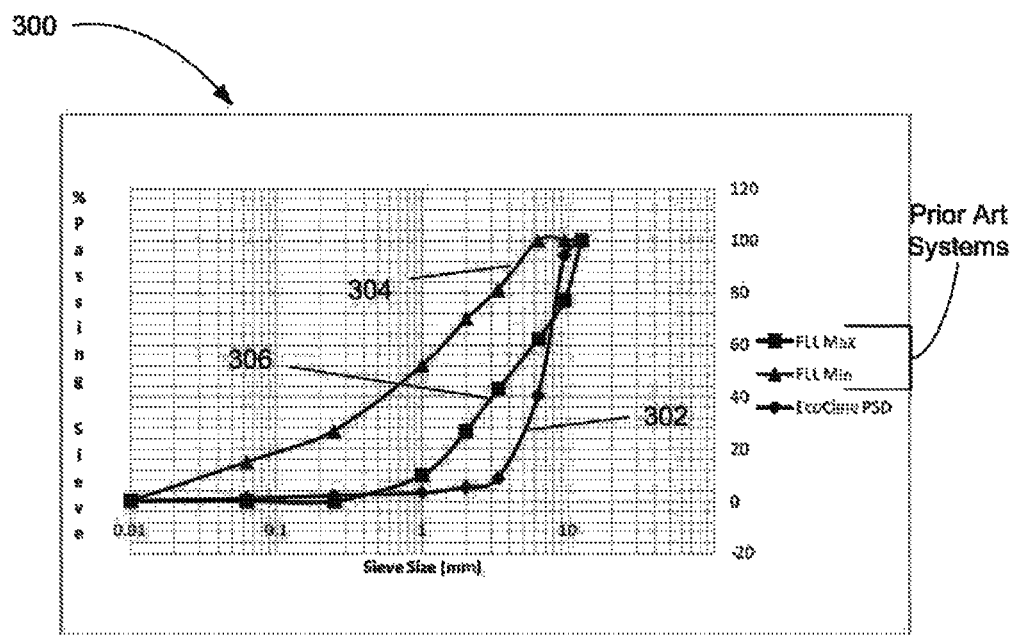
FIGS. 3-9 are graphs illustrating particle size distribution of components of vegetative systems of exemplary embodiments of the disclosure.

The composite layer 205 of such embodiments may be defined by its particle size distribution (PSD) ratios. The graph 300 provided in FIG. 3 illustrates, for an exemplary embodiment, PSD ratios of a composite layer. Graph 300 also provides a comparison between PSD ratios of this composite layer 302 and the PSD ratios imposed under the FLL guidelines 304, 306. In the embodiment illustrated on graph 300, the PSD ratios of the composite layer 302 contain relatively few mid-range sized particles in comparison to the PSD ratios imposed under the FLL guidelines, which provides for a more uniform mix of aggregate size. Instead, the PSD ratios of the exemplary composite layer include primarily coarse aggregate, some fine components (e.g., a mix of fine aggregate and fine organic components), and relatively few mid-sized components.

In a composite layer with PSD ratios like or similar to those illustrated on graph 300, the fines settle into the macro-pore space created by the large aggregate, leaving most of the macro-pore space in the top portion of the profile (which becomes the weed suppression layer) unfilled. Because of the similarity in PSD of the fine aggregate and organics in this embodiment, the nutritive layer has a higher organic content than the weed suppression layer and may be as high as 30% by volume.

Figure 4:
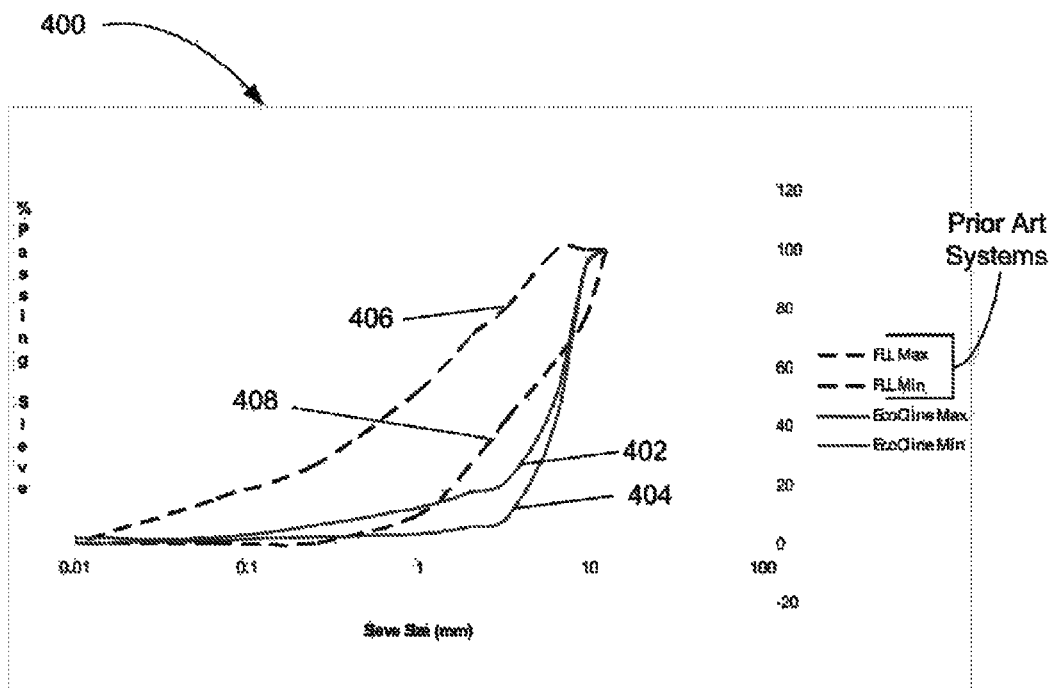

Graph 400 of FIG. 4 illustrates minimum 402 and maximum 404 PSD ratios of certain embodiments of a composite layer. Again, FLL guidelines 406, 408 are provided for reference. Table 2 below provides more detail of the range of PSD ratios of this embodiment.

TABLE 2

| Sieve Size (in mm and the equivalent U.S. Standard Mesh) | Mass Percentage of Total Particles Passing Sieve Size |
| --- | --- |
| 0.063 mm (#230) | <=2 |
| 0.25 mm (#60) | 1-7 |
| 1 mm (#18) | 3-15 |
| 2 mm (#10) | 5-20 |
| 3.35 mm (#6) | 5-25 |
| 6.3 mm (¼") | 45-55 |
| 9.5 mm (⅜") | 70-100 |
| 12.5 mm (½") | 100 |

In the composite layer of Table 2, very few particles (e.g., 2%, less than 2%, less than 1.5%, less than 0.5%, or less than 0.25%) of the composite layer will pass through a 0.063 mm (#230) sieve; between 1% and 7% (e.g., 1%, 2%, 3%, 4%, 5%, 6%, or 7%) of the particles (by mass) will pass through a 0.25 mm (#60) sieve; between 3% and 15% (e.g., 3%, 5%, 7%, 10%, 12%, or 15%) of the particles (by mass) will pass through a 1 mm (#18) sieve; between 5% and 20% (e.g., 5%, 7%, 10%, 12%, 15%, 18%, or 20%) of the particles (by mass) will pass through a 2 mm (#10) sieve; between 5% and 25% (e.g., 5%, 7%, 10%, 12%, 15%, 18%, 20%, 23%, or 25%) of the particles (by mass) will pass through a 3.35 mm (#6) sieve; between 45% and 55% (e.g., 45%, 47%, 50%, 52%, or 55%) of the particles (by mass) will pass through a 6.3 mm (¼") sieve; between 70% and 100% (e.g., 70%, 75%, 80%, 85%, 90%, 95%, or 100%) of the particles (by mass) will pass through a 9.5 mm (⅜") sieve; and 100% of the particles will pass through a 12.5 mm (½") sieve. Different PSD ratios may be used in other embodiments. For example, in another embodiment, some portion of the particles (e.g., 1%, 2%, 3%, 4%, or 5% by mass) will not pass through a 12.5 mm sieve The starting PSD ratios of a composite layer can be manipulated to achieve differing relative depths of weed suppression and nutritive layers. For example, having established a preferred depth of weed suppression layer and a nutritive layer of a particular vegetative system, as discussed in detail below, a blend may be selected for a composite layer that will yield those approximate depths.

In one example, the composite layer is comprised of a blend of 3 parts per volume of coarse aggregate, 1 part per volume of fine aggregate, and 0.75 part per volume of organic material. A 3-inch deep section of the 3:1:0.75 ratio blend of this composite layer will stratify into approximately a 2 inch weed suppression layer and a 1 inch nutritive layer. A deeper starting section of this blend will result in deeper weed suppression and nutritive layers of approximately the same ration, e.g., a 4-inch deep section of the 3:1:0.75 ratio blend of this composite layer will stratify into approximately a 2.6 inch weed suppression layer and a 1.3 inch nutritive layer. In some climates, this mix would be suitable for the growth of perennial succulents (such as plants in the genus Sedum).

A composite layer resulting in a thinner nutritive layer could utilize a ratio of 5 parts per volume coarse aggregate, 1 part per volume fine aggregate, and 0.75 part organic content. A 3-inch deep section of the 5:1:0.75 ratio blend of this composite layer will stratify into approximately a 2½ inch weed suppression layer and a ½ inch nutritive layer.

The combined PSD ratios of a vegetative system in which nutritive layers and weed suppression layers are applied separately, rather than as a composite layer, may exhibit characteristics similar to or the same as those illustrated in Table 2 and Graph 400. In an alternative embodiment of a vegetative system, in which the fine aggregate and fine organic particles of the nutritive layer are applied on top of course aggregate, the combined PSD ratios of the nutritive and weed suppression layers of that embodiment exhibit PSD ratios as illustrated in Table 3. In particular example of this embodiment, between 10% and 30% of the total combined mass of the nutritive and weed suppression layers consists of a combination of fine aggregate and fine organic particles that will pass through a 12.5 mm (½") sieve but be retained by a 9.5 mm (⅜") sieve.

TABLE 3

Combined Nutritive and Weed Suppression Layers

| Sieve Size (in mm and the equivalent U.S. Standard Mesh) | Mass Percentage of Total Particles Passing Sieve Size |
|---|---|
| 0.01 mm (pan) | <=1 |
| 0.063 mm (#230) | <=1 |
| 0.25 mm (#60) | 1-2 |
| 1 mm (#18) | 1-3 |
| 2 mm (#10) | 2-4 |
| 3.35 mm (#6) | 3-6 |
| 6.3 mm (¼") | 4-10 |
| 9.5 mm (⅜") | 5-20 |
| 12.5 mm (½") | 7-100 |
| 25.4 mm (1") | 15-100 |
| 38.1 mm (1.5") | 30-100 |
| 50.8 mm (2") | 50-100 |
| 63.5 mm (2.5") | 100% |

In the combined nutritive and weed suppression layers of Table 3, very few particles (e.g., 1%, less than 1%, less than 0.5%, or less than 0.25%) of the nutritive layer will pass through a 0.01 mm (pan) sieve or a 0.063 mm (#230) sieve; between 1% and 2% (e.g., 1%, 1.5%, or 2%) of the particles (by mass) will pass through a 0.25 mm (#60) sieve; between 1% and 3% (e.g., 1%, 1.5%, 2%, 2.5%, or 3%) of the particles (by mass) will pass through a 1 mm (#18) sieve; between 2% and 4% (e.g., 2%, 2.5%, 33%, 3.5%, or 4%) of the particles (by mass) will pass through a 2 mm (#10) sieve; between 3% and 6% (e.g., 3%, 3.5%, 4%, 4.5%, 5%, 5.5%, or 6%) of the particles (by mass) will pass through a 3.35 mm (#6) sieve; between 4% and 10% (e.g., 4%, 6%, 8%, or 10%) of the particles (by mass) will pass through a 6.3 mm (¼") sieve; between 5% and 20% (e.g., 5%, 10%, 15%, or 20%) of the particles (by mass) will pass through a 9.5 mm (⅜") sieve; between 7% and 100% (e.g., 7%, 10%, 20%, 30%, 40%, 50%, 60%, 70%, 80%, 90%, or 100%) of the particles (by mass) will pass through a 12.5 mm (½") sieve; between 15% and 100% (e.g., 15%, 20%, 30%, 40%, 50%, 60%, 70%, 80%, 90%, or 100%) of the particles (by mass) will pass through a 25.4 mm (1") sieve; between 30% and 100% (e.g., 30%, 40%, 50%, 60%, 70%, 80%, 90%, or 100%) of the particles (by mass) will pass through a 38.1 mm (1.5") sieve; between 50% and 100% (e.g., 50%, 60%, 70%, 80%, 90%, or 100%) of the particles (by mass) will pass through a 50.8 mm (2") sieve; and 100% of the particles will pass through a 63.5 mm (2.5") sieve. In another embodiment, some portion of the particles (e.g., 1%, 2%, 3%, 4%, or 5%, by mass) will not pass through a 63.5 mm sieve.

Figure 5:
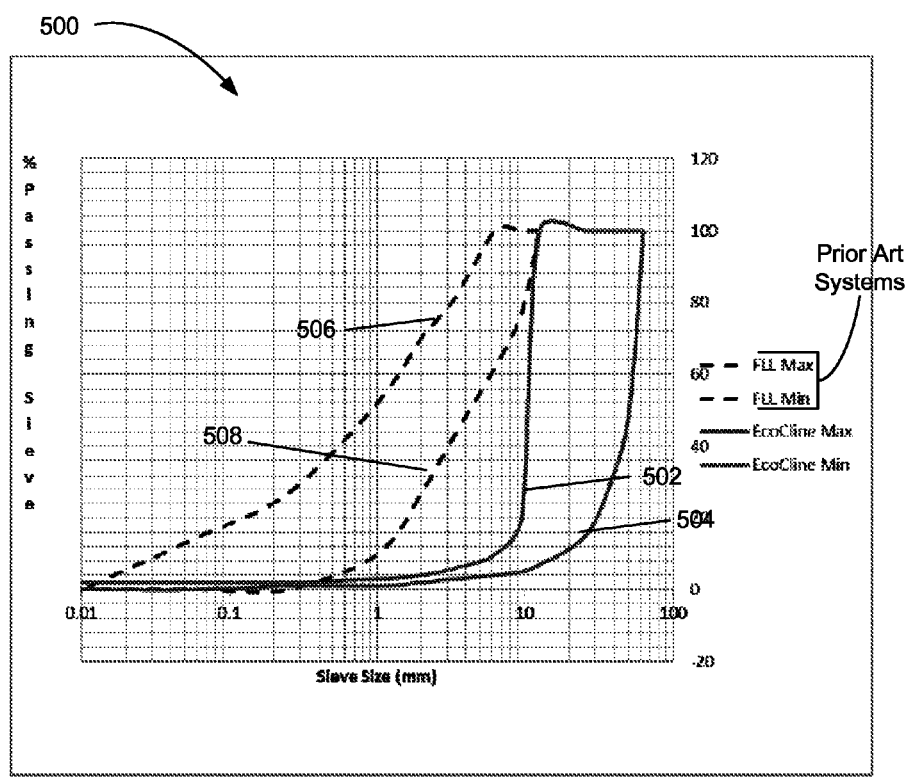

Graph 500 of FIG. 5 provides an alternative illustration of minimum 502 and minimum 504 PSD ratios of combined nutritive and weed suppression layers of an embodiment of a vegetative system. FLL guidelines 506, 508 are provided for reference.

Table 4 below, illustrates the range of PSD ratios of the nutritive layer that may result following stratification of the composite layer of Table 2. Similarly, a nutritive layer applied separately onto a water suppression layer may include a mixture of fine aggregate particles and fine organic particles with PSD ratios shown on Table 4. A nutritive layer may comprise a mixture of fine aggregate particles and fine organic particles of that, in combination, exhibit these PDS ratios; preferably a nutritive layer comprises a mixture of fine aggregate particles and fine organic particles both of which separately exhibit these PSD ratios.

TABLE 4

Nutritive Layer

| Sieve Size (in mm and the equivalent U.S. Standard Mesh) | Mass Percentage of Total Particles Passing Sieve Size |
|---|---|
| 0.063 mm (#230) | <=2 |
| 0.25 mm (#60) | 1-10 |
| 1 mm (#18) | 2 to 10 |
| 2 mm (#10) | 10 to 40 |
| 3.35 mm (#6) | 20 to 50 |
| 6.3 mm (¼") | 40-60 |
| 9.5 mm (⅜") | 70-100 |
| 12.5 mm (½") | 100 |

In the nutritive layer of Table 4, very few particles (e.g., less than 2%, less than 1.5%, less than 0.5%, or less than 0.25%) of the nutritive layer will pass through a 0.063 mm (#230) sieve; between 1% and 10% (e.g., 1%, 2%, 3%, 4%, 5%, 6%, 7%, 8%, 9%, or 10%) of the particles (by mass) will pass through a 0.25 mm (#60) sieve; between 2% and 10% (e.g., 2%, 3%, 4%, 5%, 6%, 7%, 8%, 9%, or 10%) of the particles (by mass) will pass through a 1 mm (#18) sieve; between 10% and 40% (e.g., 10%, 13%, 17%, 23%, 20%, 23%, 25%, 27%, 30%, 33%, 35%, 37%, or 40%) of the particles (by mass) will pass through a 2 mm (#10) sieve; between 20% and 50% (e.g., 20%, 23%, 25%, 27%, 30%, 33%, 35%, 37%, 40%, 43%, 45%, 47%, or 50%) of the particles (by mass) will pass through a 3.35 mm (#6) sieve; between 40% and 60% (e.g., 40%, 43%, 45%, 46%, 50%, 53%, 55%, 57%, or 60%) of the particles (by mass) will pass through a 6.3 mm (¼") sieve; between 70% and 100% (e.g., 70%, 75%, 80%, 85%, 90%, 95%, or 100%) of the particles (by mass) will pass through a 9.5 mm (⅜") sieve; and 100% of the particles will pass through a 12.5 mm (½") sieve. Different PSD ratios may be used in other embodiments. For example, in another embodiment, some portion of the particles (e.g., 1%, 2%, 3%, 4%, or 5%, by mass) will not pass through a 12.5 mm sieve.

Figure 6:
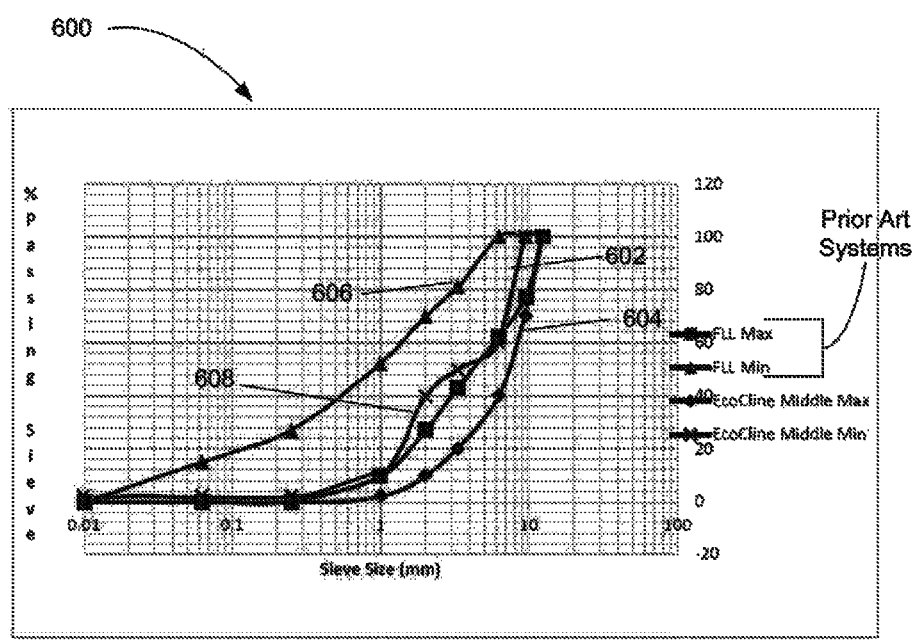

Graph 600 of FIG. 6 provides an alternative illustration of the minimum 602 and maximum 604 PSD ratios of certain embodiments of a nutritive layer of a vegetative system. Again, the range of PSD ratios for these embodiments are compared to those of the FLL guidelines 606, 608.

Figure 7:
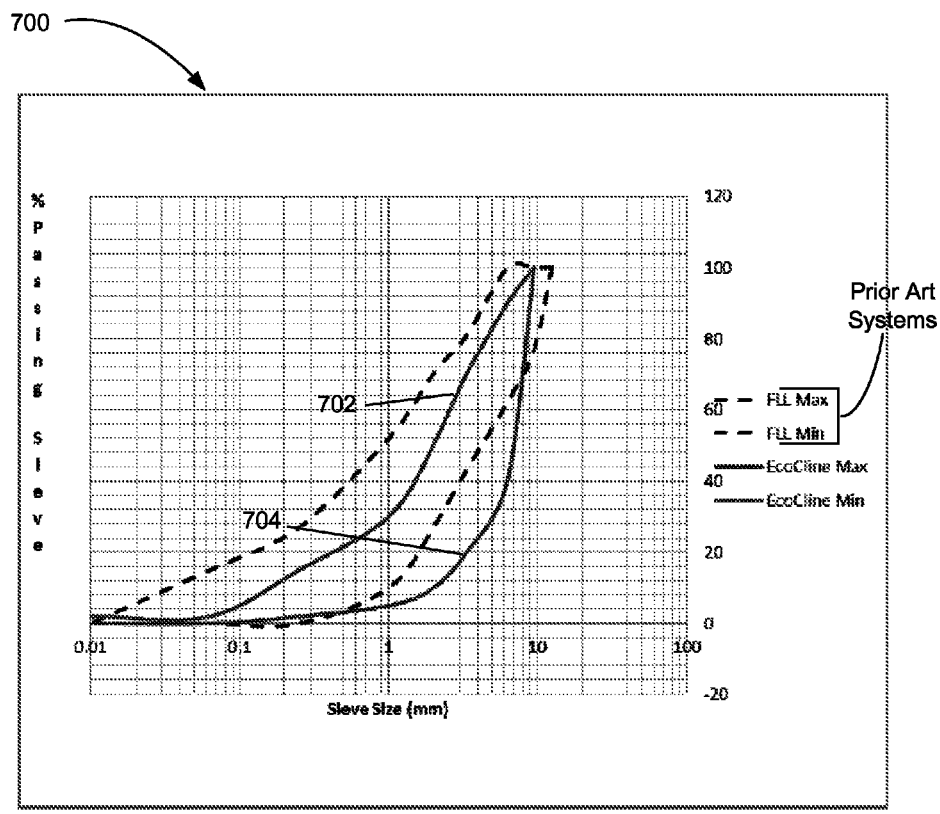

Table 5 below, illustrates a range of PSD ratios of the mixture of fine aggregate particles and fine organic particles that may be applied to the top of coarse aggregate (e.g., coarse aggregate with a PSD ratio in the range illustrated on Table 7 below) to result, upon settling, in a middle nutritive layer comprising this mixture of materials in combination with the coarse aggregate particles. (In another embodiment, a separately applied nutritive layer comprising a mixture of fine aggregate particles and fine organic particles exhibits PSD ratios in the range shown on Table 4.) Graph 700 of FIG. 7 provides an alternative illustration of these minimum 702 and maximum 704 PSD ratios. The materials of Table 5 may comprise a mixture of fine aggregate particles and fine organic particles of that, in combination, exhibit these PDS ratios; preferably, the materials comprise a mixture of fine aggregate particles and fine organic particles both of which separately exhibit these PSD ratios.

TABLE 5

Nutritive Layer Fine Particle Components

| Sieve Size (in mm and the equivalent U.S. Standard Mesh) | Mass Percentage of Total Particles Passing Sieve Size |
|---|---|
| 0.01 mm (pan) | <=2 |
| 0.063 mm (#230) | <=2 |
| 0.25 mm (#60) | 2 to 15 |
| 1 mm (#18) | 5 to 30 |
| 2 mm (#10) | 10 to 50 |
| 3.35 mm (#6) | 20 to 70 |
| 6.3 mm (¼") | 40-90 |
| 9.5 mm (⅜") | 100 |

Most of the particles in a nutritive layer of this embodiment are between 2 mm and 6.3 mm in size. More specifically, in the nutritive layer of Table 5, very few particles (e.g., less than 2%, less than 1.5%, less than 0.5%, or less than 0.25%) of the nutritive layer will pass through a 0.01 mm (pan) sieve or a 0.063 (#230) sieve; between 2% and 15% (e.g., 2%, 4%, 6%, 8%, 10%, 12%, 14%, or 15%) of the particles (by mass) will pass through a 0.25 mm (#60) sieve; between 5% and 30% (e.g., 5%, 10%, 20%, 25%, or 30%) of the particles (by mass) will pass through a 1 mm (#18) sieve; between 10% and 50% (e.g., 10%, 13%, 17%, 23%, 20%, 23%, 25%, 27%, 30%, 33%, 35%, 37%, 40%, 43%, 45%, 47%, or 50%) of the particles (by mass) will pass through a 2 mm (#10) sieve; between 20% and 70% (e.g., 20%, 25%, 30%, 35%, 40%, 45%, 50%, 55%, 60%, 65%, or 70%) of the particles (by mass) will pass through a 3.35 mm (#6) sieve; between 40% and 90% (e.g., 40%, 45%, 50%, 55%, 60%, 65%, 70%, 75%, 80%, 85%, or 90%) of the particles (by mass) will pass through a 6.3 mm (¼") sieve; and 100% of the particles will pass through a 9.5 mm (⅜") sieve. Different PSD ratios may be used in other embodiments. For example, in another embodiment, some portion of the particles (e.g., 1%, 2%, 3%, 4%, or 5%, by mass) will not pass through a 9.5 mm sieve.

In preferred embodiments of vegetative systems of this disclosure, the nutritive layer is the primary rooting zone, is composed of a range of aggregate sizes and organic matter, and is positioned in the moist space between a dry, upper weed suppression layer and a lower water retention layer. In certain preferred embodiments, between 60% and 40% of the nutritive zone is comprised of particles that will pass through a 6.3 mm sieve but will be retained by a 2 mm sieve. In other embodiments between 10% and 60%, between 20% and 60%, between 30% and 60%, between 45% and 55%, between 47% and 53%, or approximately 50% of the nutritive zone is comprised of particles that will pass through a 6.3 mm sieve but be retained by a 2 mm sieve. The PSD ratios of these embodiments may create a high percentage of micropore space.

The thickness or height of a nutritive layer may be defined as the distance between the bottom of the nutritive layer and the top of the nutritive layer. For example, in some embodiments, the bottom of the nutritive layer is that portion of the nutritive layer in contact with the water retention layer, e.g., in some embodiments of a water retention layer, a filter fabric comprising a water retention layer. The top of the nutritive layer may refer generally to any point within a transition zone between the nutritive layer and the weed suppression layer, as discussed above. In an embodiment in which a filter fabric, membrane, or other material is interposed between the nutritive layer and the weed suppression layer, the top of the nutritive layer may refer to that portion of the nutritive layer in contact with such filter fabric, membrane, or other material. The height of a nutritive layer may vary across a vegetative system of the present disclosure.

In some embodiments, the nutritive layer is between 0.25 and 18 inches thick (e.g., 0.25 inch, 0.5 inch, 1 inch, 4 inches, 6 inches, 8 inches, 10 inches, 12 inches, 15 inches, or 18 inches). In certain preferred embodiments, the nutritive layer is between 0.25 and 3 inches thick (e.g., 0.25 inch, 0.5 inch, 1 inch, 1.5 inches, 2 inches, 2.5 inches, or 3 inches). The thickness of the nutritive layer may be selected, at least in part, based on the habitable root zone of the vegetation selected for the vegetative system. In an embodiment in which the nutritive layer is between 1 and 4 inches thick, the vegetation of the vegetative system may include sedum. In an embodiment in which the nutritive layer is between 8 and 12 inches thick, the vegetation of the vegetative system may include shrubs, and in an embodiment in which the nutritive layer is 18 inches thick, the vegetation of the vegetative system may include small trees.

A nutritive layer may be further defined by its water retention capacity. In some embodiments of a nutritive layer, the nutritive layer retains less than 25% of its weight in water. In other embodiments, the nutritive layer retains between 25% and 15% (e.g., 25%, 22%, 20%, 17%, or 15%) of its weight in water.

Table 6 below illustrates the range of PSD ratios of the weed suppression layer that may result following stratification of the composite layer of Table 2.

TABLE 6

Weed Suppression Layer

| Sieve Size (metric and imperial) | Mass Percentage of Total Particles Passing Sieve Size |
|---|---|
| 0.063 mm (#230 sieve) | <2 |
| 0.25 mm (#60 sieve) | <2 |
| 1 mm (#18 sieve) | <2 |
| 2 mm (#10 sieve) | <2 |
| 3.35 mm (#6 sieve) | <2 |
| 6.3 mm (¼") | 15-50 |
| 9.5 mm (⅜") | 70-100 |
| 12.5 mm (½"): | 100 |

In the embodiment illustrated, the weed suppression layer is comprised mostly of ¼ inch to ½ inch (6.3 mm to 12.5 mm) particles; specifically, particles that will pass through a ½ inch sieve but that will not pass through a #6 sieve. In various example embodiments, less than 10%, less than 8%, less than 6%, less than 4%, less than 4%, less than 1%, less than 0.5%, or less than 0.25% of the weed suppression layer will pass through a 3.35 mm (#6) sieve; between 15% and 50% (e.g., 15%, 20%, 25%, 30%, 35%, 40%, 45%, or 50%) of the particles (by mass) will pass through a 6.3 mm (¼") sieve; between 70% and 100% (e.g., 70%, 75%, 80%, 85%, 90%, 95%, or 100%) of the particles (by mass) will pass through a 9.5 mm (⅜") sieve; and 100% of the particles will pass through a 12.5 mm (½") sieve. Different PSD ratios may be used in other embodiments. For example, in another embodiment, some portion of the particles (e.g., 1%, 2%, 3%, 4%, or 5%, by mass) will not pass through a 12.5 mm sieve.

Figure 8:
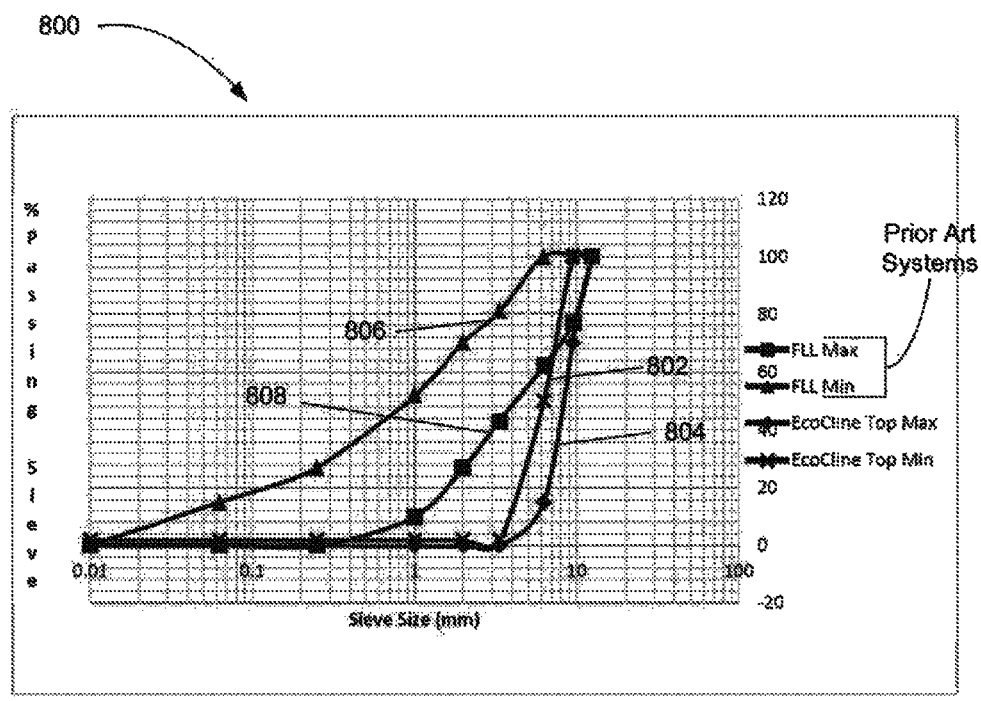

Graph 800 of FIG. 8 provides an alternative illustration of the minimum 802 and maximum 804 PSD ratios of certain embodiments of a weed suppression layer of a vegetative system. Again, the range of PSD ratios for these embodiments are compared to those of the FLL guidelines 806, 808.

Figure 9:
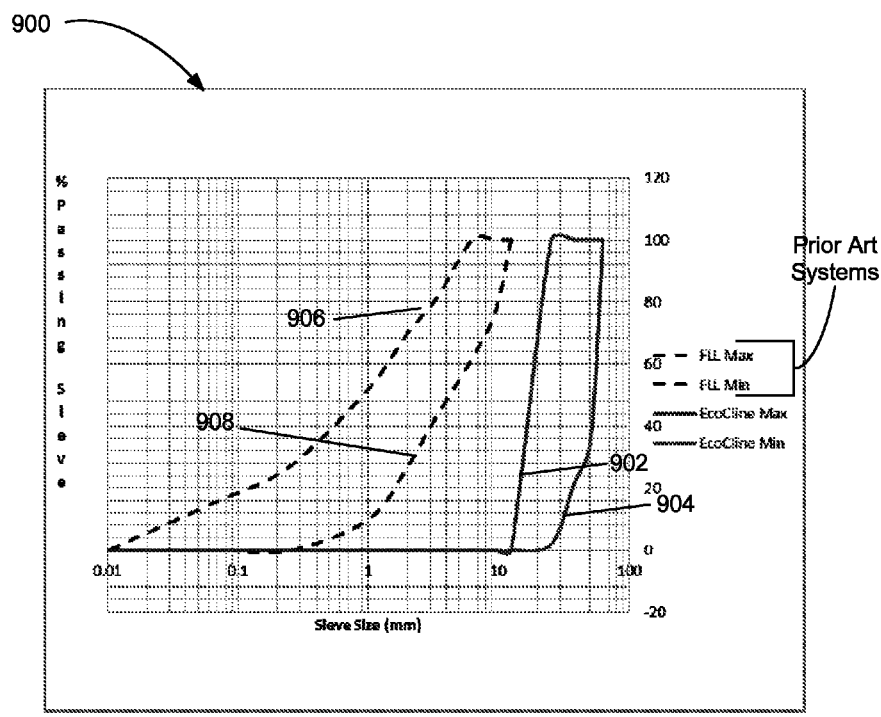

Table 7 illustrates the PSD range of another embodiment of a weed suppression layer. Graph 900 of FIG. 9 provides an alternative illustration of the minimum 902 and maximum 904 PSD ratios of certain embodiments of a weed suppression layer of a vegetative system, in comparison to the PSD ratios for these embodiments are compared to those of the FLL guidelines 906, 908.

TABLE 7

Weed Suppression Layer

| Sieve Size (metric and imperial) | Mass Percentage of Total Particles Passing Sieve Size |
|---|---|
| 63.5 mm (2.5") | 100% |
| 50.8 mm (2") | 30-100 |
| 38.1 mm (1.5") | 10-100 |
| 25.4 mm (1") | 5-100 |
| 12.5 mm (0.5") | 5-100 |

In the embodiment illustrated, the weed suppression layer is comprised mostly of coarse, inorganic aggregate particles that are between ½ inch and 2.5 inches; specifically, particles that will pass through a 2.5 inch sieve but that will not pass through a 1.2 inch sieve. In a preferred embodiment of this example, all (or substantially all) of the particles will be retained by a 9.5 mm (⅜") sieve. In various example embodiments, between 5% and 100% (e.g., 5%, 10%, 20%, 30%, 40%, 50%, 60%, 70%, 80%, 90%, or 100%) of the particles (by mass) will pass through a 12.5 mm (½") sieve; between 5% and 100% (e.g., 5%, 10%, 20%, 30%, 40%, 50%, 60%, 70%, 80%, 90%, or 100%) of the particles (by mass) will pass through a 25.4 mm (1") sieve; between 10% and 100% (e.g., 10%, 20%, 30%, 40%, 50%, 60%, 70%, 80%, 90%, or 100%) of the particles (by mass) will pass through a 38.1 mm (1.5") sieve; between 30% and 100% (e.g., 30%, 40%, 50%, 60%, 70%, 80%, 90%, or 100%) of the particles (by mass) will pass through a 50.8 mm (2") sieve; and 100% of the particles will pass through a 63.5 mm (2.5") sieve. In another embodiment, some portion of the particles (e.g., 1%, 2%, 3%, 4%, or 5%, by mass) will not pass through a 63.5 mm sieve.

A weed suppression layer with a PSD of or similar to a PSD in the range illustrated in Table 6 and graph 800, or in the range illustrated in Table 7 and graph 900, creates a dry zone that is hostile to weed seeds, but hospitable to plants of the genus Sedum. In this embodiment, only a small portion of the weed suppression layer of this embodiment comprises organic matter.

The thickness or height of a weed suppression layer may be defined as the distance between the bottom of the weed suppression layer and the top of the weed suppression layer. For example, in some embodiments, the bottom of the weed suppression layer may refer generally to any point within a transition zone between the nutritive layer and the weed suppression layer, as discussed above. In an embodiment in which a filter fabric, membrane, or other material is interposed between the nutritive layer and the weed suppression layer, the bottom of the weed suppression layer may refer to that portion of the weed suppression layer in contact with such filter fabric, membrane, or other material. In many embodiments, the top of the weed suppression layer will be the top of the vegetative system; however, vegetation planted in the vegetative system will be above the top of the weed suppression layer and, in some embodiments, a vegetation mat, a filter fabric, membrane, or other material may be placed on top of the weed suppression layer of a vegetative system of the present disclosure. The height of a weed suppression layer may vary across a vegetative system of the present disclosure.

In certain preferred embodiments, the weed suppression layer is between 0.5 and 2 inches thick (e.g., 0.5 inch, 1 inch, 1.5 inches, or 2 inches) and minimizes light penetration through to the nutritive layer. In other embodiments, the weed suppression layer is between 1 and 4 inches think (e.g., 1 inch, 1.5 inches, 2 inches, 2.5 inches, 3 inches, 3.5 inches, or 4 inches). In another embodiment, the weed suppression layer is 0.25 inch thick.

In preferred embodiments, the capillary action of weed suppression and nutritive layers with PSDs in the ranges listed on Table 4 and Table 6 allows water to flow through to the water retention layer with little retention of water within the weed suppression layer and minimal retention of water within the nutritive layer. Accordingly, in these embodiments, the nutritive layer remains moist, via its own minimal water retention and interaction with the water retention layer, but is unlikely to become saturated at a level that will promote root rot or otherwise be detrimental to the health of plants of the vegetative system.

When considering embodiments of vegetative systems in which the nutritive and weed suppression layers are provided separately, the PSD ratios of the layers as initially applied may be the same as or similar to the PSD ratios of the nutritive and weed suppression layers that result from separation of an initial composite layer.

Figure 10:
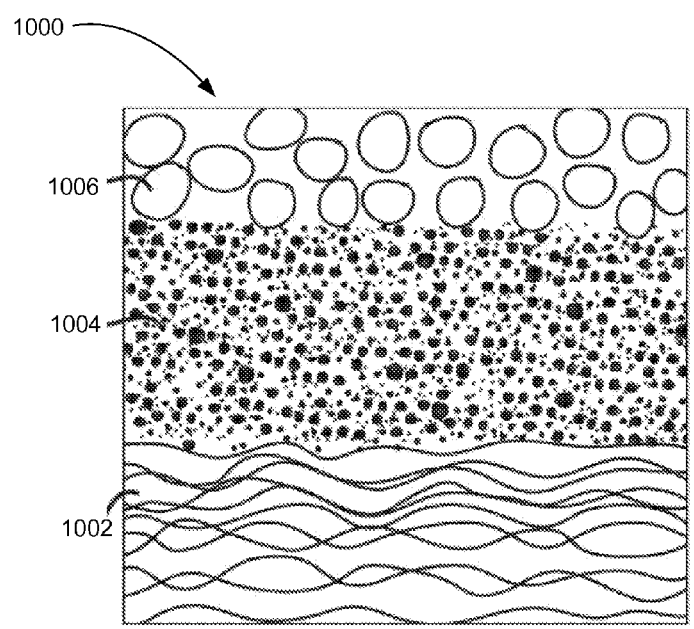
FIG. 10 is an illustration of a further exemplary embodiment of a vegetative system of the disclosure.

In other embodiments, such as the embodiment of a vegetative system 1000 illustrated in FIG. 10, when a nutritive layer 1004 is applied to a water retention layer 1002 as a separate layer, relatively few particles (e.g., less than 20%, less than 15%, less than 10%, less than 7%, less than 5%, less than 3%, or less than 1%, by mass) that will not pass through a 6.3 mm (1.4") sieve are included in the nutritive layer 1004. In vegetative system 1000, most (e.g., at least 70%, at least 73%, at least 75%, at least 77%, at least 80%, at least 83%, at least 85%, at least 87%, at least 90%, at least 93%, or at least 95%) of the particles of the weed suppression layer 706 will pass through a ½ (12.5 mm) sieve but will not pass through a 3.35 mm (#6) sieve.

The coarse aggregate of the nutritive layer (for embodiments that include coarse aggregate in the nutritive layer), the weed suppression layer, and, if applicable, the composite layer, generally refers to those particles that will not pass through a 3.35 mm (#6) sieve; however, other appropriate characteristics may be used to define an aggregate as "coarse". Inorganic materials consisting primarily of minerals are preferred for the coarse aggregate of vegetative systems of the invention. Materials selected for the coarse aggregate preferably resist fracturing and decay and, therefore, substantially retain the starting PSDs. Such materials may include one or more of crushed brick, granite, bottom ash, haydite, diatomite, calcined clays, limestone, silicaceous gravel, flint, marble, naturally occurring volcanic aggregate, and other materials with similar durability.

In some preferred embodiments, the coarse aggregate consists primarily of crushed brick. Particularly preferred is post-industrial waste brick or demolition product brick.

Preferably, at least 80% of the weed suppression layer (by mass) is composed of inorganic material. In other embodiments, at least 90%, at least 95%, at least 98%, or at least 99% of the weed suppression layer (by mass) is composed of inorganic material.

Fine aggregate particles generally refers to particles that will pass through a 3.35 mm (#6) sieve; however, other appropriate characteristics may be used to define a particle as "fine."

In certain preferred embodiments, the fine aggregate of the nutritive layer or the composite layer (which may be present in relatively small quantities in the weed suppression layer) has a cation exchange capacity (CEC) in the range of 6 cmol/$kg^1$ to 10 cmol/$kg^1$ (e.g., 6 cmol/$kg^1$, 6.5 cmol/$kg^1$, 7 cmol/$kg^1$, 7.5 cmol/$kg^1$, 8 cmol/$kg^1$, 8.5 cmol/$kg^1$, 9 cmol/$kg^1$, 9.5 cmol/$kg^1$, 9.9 cmol/$kg^1$, or 10 cmol/$kg^1$). A CEC in this range, in combination with moisture, provides a high level of nutrient availability within the nutritive layer. In some embodiments, the CEC of the fine aggregate is greater than 10 cmol/$kg^1$, and in other embodiments, the CEC of the fine aggregate is less than 6 cmol/$kg^1$.

In certain preferred embodiments, the fine aggregate particles of the vegetative system resist fracturing or decay and, therefore, substantially retain the starting PSD. Inorganic materials consisting primarily of minerals are preferred for the fine aggregate of vegetative systems of the invention. Such materials may include one or more of crushed brick, pumice, calcined clay, haydite, appropriate volcanic rock (scoria), diatomite, zeolite, akadama, kanuma, high density crushed foamed glass, granite, and other materials with similar durability and internal microporosity. In a preferred embodiment of a vegetative system of this disclosure, the fine aggregate particles consists primarily of crushed brick.

Materials for each of the coarse aggregate and the fine aggregate may be further defined by their internal micropore and mesopore characteristics. Materials with a relatively high internal micropore and mesopore space or certain inherent arrangements of micropores and macropores will promote water transmission to the surface of the vegetative system profile; such water transmission partially dictates rates of evaporative loss and evaporative cooling. In some embodiments, material that includes internal micropores is preferred for the coarse aggregate, the fine aggregate, or both.

In certain preferred embodiments of vegetative systems of the invention, the density of the aggregate media is between 40 and 80 lbs/$ft^3$ (e.g., 40 lbs/$ft^3$, 45 lbs/$ft^3$, 50 lbs/$ft^3$, 55 lbs/$ft^3$, 60 lbs/$ft^3$, 65 lbs/$ft^3$, 70 lbs/$ft^3$, 75 lbs/$ft^3$, or 80 lbs/$ft^3$). In a particularly preferred embodiment, the density of the aggregate is approximately 55 lbs/$ft^3$.

In some embodiments, organic matter comprises between 10% and 50% (e.g., 10%, 15%, 20%, 25%, 30%, 35%, 40%, 45%, or 50%) of the nutritive layer, by mass. In other embodiments, organic matter comprises more than 50% of the nutritive layer. In yet another embodiment, organic matter comprises less than 10% of the nutritive layer.

For applications that must be compliant with fire regulatory codes, a total organic content of the combined weed suppression layer and nutritive layer preferably comprises no more than 20% of total aggregate volume.

Broadly speaking the organic matter of the nutritive layer or the composite layer (which may be retained or otherwise found in the weed suppression layer to a small extent) provides a nutrient source for plants in the vegetative system. Over time, the original organic material may be replaced and replenished with organic matter via shed leaves and decayed root fibers.

Organic material of the nutritive layer may include one or more of pine bark fines, a peat based organic source, aged compost, coir dust, milled long fiber sphagnum moss, grade 1 biosolids, or other organic materials. In certain preferred embodiments, the organic material consists primarily of aged pine bark fines.

In certain preferred embodiments, the organic matter substantially retains its structural integrity for a long time (e.g., at least 5 years, at least 10 years, or more than 10 years) and has a cation exchange capacity (CEC) in the range of 6 cmol/$kg^1$ to 10 cmol/$kg^1$ (e.g., 6 cmol/$kg^1$, 6.5 cmol/$kg^1$, 7 cmol/$kg^1$, 7.5 cmol/$kg^1$, 8 cmol/$kg^1$, 8.5 cmol/$kg^1$, 9 cmol/$kg^1$, 9.5 cmol/$kg^1$, 9.9 cmol/$kg^1$, or 10 cmol/$kg^1$).

In addition, the organic component may include micro and macro nutrients, e.g., micro and macro nutrients that are largely water insoluble and that are necessary or desirable for long term healthy plant growth. In these and other embodiments, nutrients may be applied after a vegetative system has been assembled, e.g., instead of or in addition to inclusion of nutrients in the organic component of the nutritive layer.

The weed suppression layers and nutritive layers may be further defined by the water retention capacity of the layers, both individually and in combination. In some embodiments, the aggregate component (top and middle layers combined) holds approximately 0.15 gallons per 1 inch depth, most of which is retained within the nutritive layer. In one example embodiment, the water retention capacity, by volume, of the combined weed suppression and nutritive layers (or of the composite layer), is approximately 26%, calculated as follows:

A 12-inch by 12-inch sample of a 1-inch thick combined weed suppression and nutritive layer (or of the composite layer), e.g., a sample with a volume of 0.623 gallons, weighs 4.52 pounds when dry and 5.83 pounds when saturated (according to the steps described above). That sample is retaining 1.31 pounds of water (5.83−4.52=1.31).

1 gallon of water typically weighs 8.35 pounds. Using this weight, 1.31 pounds of retained water is approximately equivalent to 0.16 gallons of retained water (1.31/8.35=0.16).

In this example, 0.16 gallons of retained water equates to a water retention of 26% of its dry volume (0.16/0.623=0.26).

In certain embodiments, the water retention capacity, by volume, of the combined weed suppression and nutritive layer (or of the composite layer) is between 60% and 20% (e.g., 60%, 55%, 50%, 45%, 40%, 35%, 30%, 25%, or 20%).

Other Components of Vegetative Systems
Vegetation

Certain preferred embodiments of vegetative systems of this disclosure are particularly suited for plants in the genus Sedum and related roof plants. Among such plants are *Allium cernuum, Allium schoenoprasum, Allium senescens montanum, Delosperma cooperi, Delosperma nubigenum, Dianthus carthusianorum, Sedum acre, Sedum aizoon, Sedum ellacombianum, Sedum floriferum, Sedum hybridum, Sedum kamtschaticu, Sedum oreganum, Sedum pulchellum, Sedum seiboldii, Sedum rupestre, Sedum spurium, Sedum stoloniferum, Sedum telephium, Phedimus takesimense*, and *Talinum calycinum*. Other embodiments of vegetative systems of this disclosure may be suitable for ornamental grasses, shrubs, small trees, and other perennials, annuals, biennials, or other vegetation.

Filter Fabric

In addition to the filter fabric that may be a component of the water retention layer, in certain embodiments, vegetative systems may include a filter or separate fabric, such as a filter fabric with characteristics similar to those listed in Table 1 above, between other layers or components.

Membrane Protection Layers

The water retention layer of vegetative systems of the present disclosure may be placed directly on a waterproofing membrane of a typical roofing construction. However, if required by the roofing manufacture, or if otherwise necessary or desirable, the water retention layer may be placed on top of a combination of membrane protection layers. Such layers may include one or more of an air layer, a protection layer, and a root barrier.

An air layer refers to an impervious layer of material that is held off the roofing membrane to create an air space between the water retention layer of a vegetative system and the roof, in a manner that minimizes air contact with the water retention layer, thereby reducing the likelihood that the water retention layer will become excessively dry. In some embodiments, a non-perforated, cup-type composite drain sheet is used to create an air layer. Such a drain sheet may be approximately 40 inches thick, may have a flow at a hydraulic gradient of 1 of 21 g/min/ft (as measured per ASTM D-4716), and a compressive strength of 15,000 psf (as measured per ASTM D-1621).

A protection layer refers to a material used to protect the waterproofing membrane from mechanical damage during and after installation. By way of example, a needle punched nonwoven polypropylene fiber geotextile may be used as a protection layer.

A root barrier refers to a root-impervious liner placed just above the waterproofing membrane and, preferably, exhibits characteristics (such as tensile strength, elongation, tear resistance, puncture resistance, UV resistance) suitable for such purpose.

Other items that may be used in combination with vegetative systems of the present disclosure include a temporary surface protection layer (e.g., a biodegradable fabric), edging (e.g., aluminum L-shaped edging), stepping stone pavers, or gravel borders.

Although the water retention layer provides the bulk of storm water retention, some water retention is provided by the nutritive layer (and a small portion by the weed suppression layer). For example, in certain preferred embodiments, the combined nutritive and weed suppression layers will retain approximately 0.15 gallons of water per square foot per inch of depth, which equates to a rain capacity of about 0.25 inches. Accordingly, when determining minimum requirements for a vegetative system of the present disclosure that will provide adequate storm water protection for a particularly sized rain event, the water retention capacity of the entire system may be considered.

Fire resistance will be determined based on the entire system and, accordingly achieving a particular fire resistance rating will be dependent upon the combination of materials, and quantities of materials, selected for the system components.

Table 8 below, lists the weight, water holding capacity, maximum rain event capacity, and other features of various combinations of sizes of water retention layers and weed suppression and nutritive layers (referred to collectively in Table 5 as the "media layer"). In each of these embodiments, the water retention layer consists primarily of rock wool with a density of 8 lbs/ft$^3$, the nutritive layer consists primarily of a mix of crushed brick coarse and fine aggregate and organic fines with a PSD ratio similar to the range shown in Table 4, and the weed suppression layer consists primary of crushed brick coarse aggregate with a PSD ratio similar to the range shown in Table 6.

TABLE 8

| Total System Depth (in inches) | Media Layer/Water Retention Layer Depths (in inches) | Dry Weight (in lb/ft$^2$) | Maximum Fully Saturated Weight (in lb/ft$^2$) | Water Retention Capacity (in gal/ft$^2$) | Maximum Rain Event Capacity (in inches) | ANSI/SPRI RP-14 Class | ANSI VF-1 Rating |
|---|---|---|---|---|---|---|---|
| 2 | 1/1 | 5-6 | 11-12 | 0.7 | 1.1 | N/A | Class A |
| 3.25 | 2.25/1 | 11 | 18-19 | 0.9 | 1.4 | #4 ballast | Class A |
| 4 | 3/1 | 13-15 | 22-24 | 1.0 | 1.5 | #2 ballast | Class A |
| 3 | 1/2 | 6-7 | 16-17 | 1.2 | 2.0 | N/A | Class A |
| 4.25 | 2.25/2 | 11-12 | 23-24 | 1.5 | 2.2 | #4 ballast | Class A |
| 5 | 3/2 | 15-16 | 28-29 | 1.6 | 2.4 | #2 ballast | Class A |
| 6 | 3/3 | 15-16 | 33-34 | 2.1 | 3.4 | #2 ballast | Class A |

Assembling Vegetative Systems

Discussed above are factors that may be considered in selecting quantities of and materials for the components of the water retention, nutritive, and weed suppression layers. In addition, quantities of and materials for the components of vegetative systems may be selected based on factors applicable to the system as a whole, such as uplift resistance, weight, storm water retention needs, and other climate-specific factors.

The density of the coarse aggregate of the weed suppression and nutritive layers will largely dictate the minimum aggregate depth to achieve a desired uplift resistance because that material provides the bulk of the unsaturated weight of the system. In an example embodiment, a system comprising weed suppression and nutritive layers with a combined depth of 2.25 inches and a 1 inch water retention layer will have a dry weight of 11 lb/ft$^2$ and, accordingly is sufficiently heavy to achieve a #4 ballast rating (based on ANSI/SPRI RP-14 Class).

The capacity of the roof (or other supporting structure) may dictate over-all weight restrictions. Accordingly, in such instances the weight of the entire system, both dry and fully saturated, should be considered.

In these examples, retention performances listed were gathered via empirical measurements. The ANSI/SPRI RP-14 system classification listed for each profile reflects the wind uplift resistance classification for each system. The ANSI VF-1 Rating is indicative of fire resistance.

FIG. 2 illustrates an exemplary embodiment of a newly-assembled vegetative system of the invention comprising a composite layer 205. The system 200 of FIG. 2 may be assembled by installing the water retention layer 202 over the membrane protection layers 208 that have been placed on top of the roof system 210. The water retention layer 202 may be installed with hand-tight joints or other appropriate installation methods. In this embodiment, the water protection layer 202 comprises a filter fabric 212. Media comprising a composite layer 205 may be installed over the water protection layer 202 to the desired depth.

Vegetation may be installed in the composite layer 205 in accordance with accepted horticulture practice. Nutrients, such as phosphorus, nitrogen, calcium, magnesium, chlorine, iron, boron, and zinc may be applied to the surface of the vegetative system, e.g., in a slow release formulation. In an example embodiment, 50 lbs/15,000 f$^2$ of a 18-1-8+Fe (which signifies the nitrogen, phosphorus, potassium ratio plus chelated iron) mixture, formulated to be 80% slow release and 20% quick release, is applied upon assembly of the vegetative system.

Over time, the system 200 of FIG. 2 will begin to resemble the system 100 of FIG. 1 with a more distinct nutritive layer 104 and weed suppression layer 106; vegetation 108 may become established within the vegetative system.

In another embodiment, a vegetative system may be assembled by installing the water retention layer over membrane protection layers that have been placed on top of the roof system. Media comprising a nutritive layer may be installed over the water protection layer to the desired depth and then media comprising a weed suppression layer may be installed over the nutritive layer to the desired depth.

Vegetation may be installed in the vegetative system in accordance with accepted horticulture practice and nutrients may be applied to the surface of the vegetative system.

In another embodiment of methods of installing a vegetative system, one that is particularly preferred for use in connection with a vegetative system comprising a weed suppression layer with a PSD in the range illustrated in Table 7 and a mixture of fine aggregate and fine organic particles with a PSD in the range illustrated in Table 5, a water retention layer is installed as described above and then the coarse aggregate that comprises the weed suppression layer is installed on the water retention layer to the desired depth. The blend of fine aggregate and fine organic particles that comprise the nutritive layer is then installed on top of the coarse aggregate.

Over time (e.g., in various embodiments, within the first growing season, within about 2 weeks, within about 1 month, within about two 2 months, or within about 3 months) the materials will separate to form a substantially distinct lower nutritive layer and an upper weed suppression layer. Separation may be allowed to occur naturally over time, in which settlement is promoted via rainfall or may be encouraged with supplied water application. However, there may not be clear distinction between the weed suppression layer and the nutritive layer as the composite layer (over time) may gradually transition from a coarser, drier aggregate above (e.g., the weed suppression layer) to a finer, moister aggregate below (e.g., the nutritive layer).

A vegetative system is preferably disposed on the roof of a structure. In an embodiment, the vegetative system covers at least 100 square feet of the roof. In another embodiment, the vegetative system covers at least 250 square feet of the roof, and in a further embodiment, the vegetative system covers at least 500 square feet of the roof. Coverage need not be contiguous and portions of a vegetative system disposed on a roof may be separated by walkways or other gaps.

Various characteristics of vegetative systems of the invention represent significant improvements over existing vegetative systems. For example, by deviating from particle size distributions recommended by the FFL guidelines, certain vegetative systems of the invention promote water flow through to the water retention layer and facilitate a level of moisture within the nutritive layer that is beneficial to healthy plant growth. Furthermore, by providing (in certain preferred embodiments) substantially distinct zones (or layers) to serve as the primary source of the functions of water retention, nutritive source, and weed suppression, the functionality of each distinct zone may be maximized, thereby improving the functionality of the system as a whole.

In addition, vegetative systems of the invention may retain more storm water than traditional green roofs. Measuring storm water performance empirically indicates that a 2 inch thick vegetative system of the invention will provide storm water retention comparable to a traditional 4-inch green roof. Similarly, such measurements indicate a 4 inch thick vegetative system of the invention will retain as much storm water as an 8-inch thick traditional green roof.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A vegetative system disposed on a roof of a structure, the vegetative system comprising:
    an upper weed suppression layer; a middle nutritive layer; and a lower water retention layer; wherein:
    the water retention layer has a water retention capacity, by volume, of at least approximately 60%;
    the nutritive layer comprises a mixture of fine aggregate particles and fine organic particles that will pass through a 3.35 mm sieve; and
    the weed suppression layer primarily comprises free-flowing, coarse aggregate particles that will pass through a 63.5 mm sieve and be retained by a 3.35 mm sieve;
    wherein at least approximately 10% of the particles (by mass) comprising the weed suppression layer will pass through a 38.1 mm sieve, at least approximately 30% of the particles (by mass) comprising the weed suppression layer will pass through a 50.8 mm sieve; and most of the particles comprising the weed suppression layer will pass through a 63.5 mm sieve.

2. The vegetative system of claim 1 in which the water retention layer has a water retention capacity, by volume, of at least approximately 80% and the nutritive layer has a water retention capacity, by volume, of less than approximately 60%.

3. The vegetative system of claim 2 in which the water retention layer retains at least approximately 80% of its water retention capacity under 100 pounds of compression.

4. The vegetative system of claim 1 in which the water retention layer comprises rock wool.

5. The vegetative system of claim 4 in which the density of the rock wool is in a range of approximately 8 pounds per cubic foot to approximately 16 pounds per cubic foot.

6. The vegetative system of claim 5 in which the height of the water retention layer is between approximately 1 inch and approximately 6 inches.

7. The vegetative system of claim 1 in which the nutritive layer further comprises coarse aggregate particles that will not pass through a 3.35 mm sieve.

8. The vegetative system of claim 7 in which
    (a) between approximately 10% and approximately 40% of the particles (by mass) comprising the nutritive layer will pass through a 2 mm sieve; between approximately 20% and approximately 50% of the particles (by mass) comprising the nutritive layer will pass through a 3.35 mm sieve; between approximately 40% and approximately 60% of the particles (by mass) comprising the nutritive layer will pass through a 6.3 mm sieve; and at least approximately 70% of the particles (by mass) comprising the nutritive layer will pass through a 9.5 mm sieve; and (b) less than approximately 10% of the particles (by mass) comprising the weed suppression layer will pass through a 3.35 mm sieve; between approximately 15% and approximately 50% of the particles (by mass) comprising the weed suppression layer will pass through a 6.3 mm sieve; and at least approximately 70% of the particles (by mass) comprising the weed suppression layer will pass through a 9.5 mm sieve.

9. The vegetative system of claim 7 in which the organic matter particles of the nutritive layer comprise pine fines and in which the fine aggregate particles and the coarse aggregate particles of the nutritive layer comprise crushed brick.

10. The vegetative system of claim 7 in which the fine aggregate particles and the coarse aggregate particles of the nutritive layer consist primarily of crushed brick.

11. The vegetative system of claim 1 in which the organic matter particles of the nutritive layer comprise between approximately 20% and approximately 30% of the mass of the nutritive layer.

12. The vegetative system of claim 1 in which the nutritive layer comprises particles having a cation exchange capacity (CEC) in a range of approximately 6 cmol/kgl to approximately 10 cmol/kgl.

13. The vegetative system of claim 1 in which the height of the nutritive layer is between approximately 0.25 inch and approximately 4 inches.

14. The vegetative system of claim 1 in which less than approximately 10% of the particles (by mass) comprising the weed suppression layer will pass through a 3.35 mm sieve; between approximately 15% and approximately 50% of the particles (by mass) comprising the weed suppression layer will pass through a 6.3 mm sieve; and at least approximately 70% of the particles (by mass) comprising the weed suppression layer will pass through a 9.5 mm sieve.

15. The vegetative system of claim 1 in which the coarse aggregate particles of the weed suppression layer comprise crushed brick.

16. The vegetative system of claim 1 in which the height of the weed suppression layer is between approximately 0.5 inch and approximately 2 inches thick.

17. The vegetative system of claim 1 in which at least approximately 95% of the particles comprising the weed suppression layer will pass through a 63.5 mm sieve.

18. A vegetative system disposed on a roof of a structure, the vegetative system comprising:
a water retention layer having a water retention capacity, by volume, of at least approximately 60%; and
a composite layer comprising fine organic particles, fine aggregate particles, and coarse aggregate particles, wherein between approximately 5% and approximately 25% of the particles (by mass) comprising the composite layer will pass through a 3.35 mm sieve; between approximately 45% and approximately 55% of the particles (by mass) comprising the composite layer will pass through a 6.3 mm sieve; and at least approximately 70% of the particles (by mass) comprising the composite layer will pass through a 9.5 mm sieve.

19. The vegetative system of claim 18 in which less than approximately 2% of the particles (by mass) comprising the composite layer will pass through at 0.063 sieve; between approximately 3% and approximately 15% of the particles (by mass) comprising the composite layer will pass through a 1 mm sieve; and between approximately 5% and approximately 20% of the particles (by mass) comprising the composite layer will pass through a 2 mm sieve.

20. The vegetative system of claim 18 in which the water retention layer has a water retention capacity of at least approximately 80% of its volume and wherein the water retention layer retains at least approximately 80% of the water retention capacity under 100 pounds of compression per square foot.

21. The vegetative system of claim 18 in which the water retention layer comprises rock wool having a density in a range of approximately 8 pounds per cubic foot to approximately 16 pounds per cubic foot.

22. The vegetative system of claim 21 in which the height of the water retention layer is between approximately 1 inch and approximately 6 inches and in which the height of the composite layer is between approximately 0.75 inch and approximately 6 inches.

23. The vegetative system of claim 22 in which the organic matter particles of the composite layer comprise pine fines and in which the fine aggregate particles and the coarse aggregate particles of the composite layer comprise crushed brick.

24. The vegetative system of claim 18 in which the fine aggregate particles of the composite layer have a cation exchange capacity (CEC) in a range of approximately 6 cmol/kgl to approximately 10 cmol/kgl.

25. The vegetative system of claim 18 in which the fine organic particles of the composite layer have a cation exchange capacity (CEC) in a range of approximately 6 cmol/kgl to approximately 10 cmol/kgl.

26. The vegetative system of claim 18 in which the composite layer comprises particles having internal micropores.

27. The vegetative system of claim 18 in which the composite layer has a water retention capacity, by volume, in a range of between approximately 60% and approximately 20%.

28. A vegetative system disposed on a roof of a structure, the vegetative system comprising:
a water retention layer having depth between approximately one inch and approximately three inches, a water retention capacity, by volume, of at least approximately 80%, and that retains at least approximately 80% of the water retention capacity under 100 pounds of compression; and
a bed of material comprising aggregate particles having a depth between approximately two inches and approximately four inches wherein between approximately 5% and approximately 25% of the particles (by mass) will pass through a 3.35 mm sieve, between approximately 45% and approximately 55% of the particles (by mass) will pass through a 6.3 mm sieve; and at least approximately 70% of the particles (by mass) will pass through a 9.5 mm sieve.

29. The vegetative system of claim 28 in which the bed of material changes as a function of time;
wherein at a first data point between approximately 5% and approximately 25% of the particles (by mass) will pass through a 3.35 mm sieve, between approximately 45% and approximately 55% of the particles (by mass) will pass through a 6.3 mm sieve; and at least approximately 70% of the particles (by mass) will pass through a 9.5 mm sieve;
wherein at a second data point between approximately 70% and approximately 100% of the particles in the top one half inch of the material will pass through a 12.5 mm sieve but will not pass through a 3.35 mm sieve and between approximately 50% and approximately 10% of the particles in the bottom one half inch of the material will pass through a 6.3 mm sieve but will not pass through a 2 mm sieve; and wherein the time between the first data point and the second data point is at least thirty days.

30. A method of installing a vegetative system disposed on a roof of a structure, the method comprising:

installing a water retention layer having depth between approximately one inch and approximately three inches, a water retention capacity, by volume, of at least approximately 80%, and that retains at least approximately 80% of the water retention capacity under 100 pounds of compression per square foot;

installing coarse aggregate particles to a depth between approximately one inch and approximately six inches wherein at least approximately 10% of the particles (by mass) will pass through a 38.1 mm sieve, at least approximately 30% of the particles (by mass) will pass through a 50.8 mm sieve; and most of the particles will pass through a 63.5 mm sieve;

installing a mixture of fine aggregate and fine organic particles with a mass between approximately 10% and approximately 30% of the combined mass of the coarse aggregate particles, the fine aggregate particles, and the fine organic particles on top of the coarse aggregate particles.

* * * * *